United States Patent [19]

Tanaka

[11] Patent Number: 4,890,943
[45] Date of Patent: Jan. 2, 1990

[54] BEARING

[75] Inventor: Koichi Tanaka, Aichi, Japan

[73] Assignee: Kabushiki Kaisha Chubu Bearing Seisakusho, Japan

[21] Appl. No.: 195,631

[22] Filed: May 17, 1988

[51] Int. Cl.$^4$ ............................................. F16C 33/46
[52] U.S. Cl. ..................................... 384/572; 384/569; 384/576
[58] Field of Search ............... 384/572, 576, 570, 569, 384/531, 578

[56] References Cited

U.S. PATENT DOCUMENTS

| | | |
|---|---|---|
| 2,365,154 | 12/1944 | Storz . |
| 2,670,253 | 2/1954 | Scherler ........................... 384/570 |
| 3,892,447 | 7/1975 | Gruber et al. ..................... 384/576 |
| 3,980,359 | 9/1976 | Wetherbee, Jr. . |
| 4,428,628 | 1/1984 | Brown . |
| 4,621,932 | 11/1986 | Küfner et al. ..................... 384/569 |

FOREIGN PATENT DOCUMENTS 1915746 5/1985 Fed. Rep. of Germany .

Primary Examiner—Lenard A. Footland
Attorney, Agent, or Firm—Lowe, Price, Leblanc, Becker & Shur

[57] ABSTRACT

A needle roller bearing is arranged with a reduced friction between a retainer and the remainder of the bearing construction. The retainer is formed of a ring-shaped connecting member and a plurality of roller supporters which are formed integrally with the connecting member therewithin at longitudinally middle points thereof. The roller supporters are disposed with equal distances therebetween to provide spaces for rotatably supporting needle rollers. The retainer is supported at the ring-shaped connecting member by an annular groove formed in the outer race.

10 Claims, 2 Drawing Sheets

BEARING

BACKGROUND OF THE INVENTION

1. Field of the Invention

The present invention relates to a bearing having needle rollers which is applied to business machines or the like.

2. Description of the Prior Art

As shown in FIG. 4, needle rollers b are rotatably held within a generally annular retainer a having a side wall a1, the rollers b being disposed circumferentially with proper distances therebetween and protruding in radial direction outwardly from the outer circumferential surface and inwardly from the inner circumferential surface of the retainer a. The assembly of the rollers b and the retainer a is combined with an outer race c and an inner race d so that the surfaces of the rollers are rotatably in contact with the inner circumferential surface of the outer race c and the outer circumferential surface of the inner race d.

With the prior art bearing above-mentioned, since the retainer is provided with the side wall a1, the outer race c which supports the retainer a therein tends to be large in size. Also, the side wall a1 tends to impose frictional drag on the inner surface of the outer race. Further, even if the inner race d is eliminated, the needle rollers b cannot directly contact a shaft.

SUMMARY OF THE INVENTION

The present invention solves the aforementioned problems and is to provide a compact bearing of this type by carefully arranging the structure of the retainer. For achieving the above-mentioned purpose, the present invention employs an arrangement in which;

a bearing comprises an outer race, a retainer which is rotatably supported within the outer race, and a plurality of needle rollers rotatably supported by the retainer, wherein the retainer includes;

a ring-shaped connecting member; and a plurality of elongate roller supporters respectively connected integrally with the connecting member therewithin substantially at longitudinally middle points thereof, and extending sideways beyond the ring-shaped connecting member in parallel to an axis of the ring-shaped connecting member, the roller supporters being disposed with equal distances therebetween to provide spaces for supporting the needle rollers therein; and the ring-shaped connecting member being coaxially rotatably supported in the outer race.

DESCRIPTION OF PREFERRED EMBODIMENTS

Figure 2:
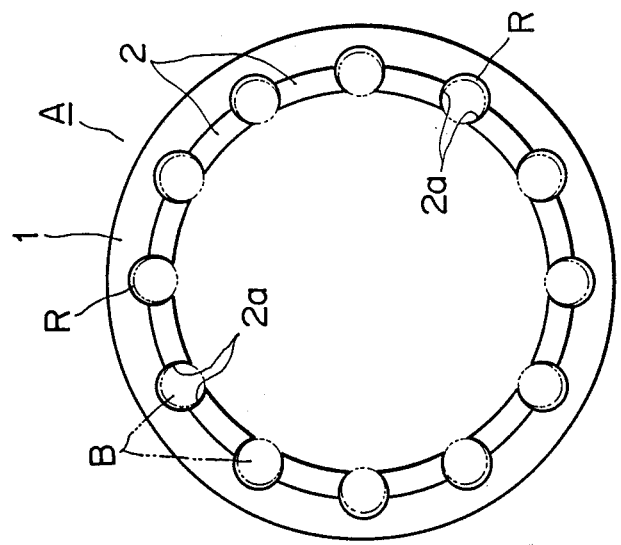
FIG. 2 is a side view of a retainer.
Figure 1:
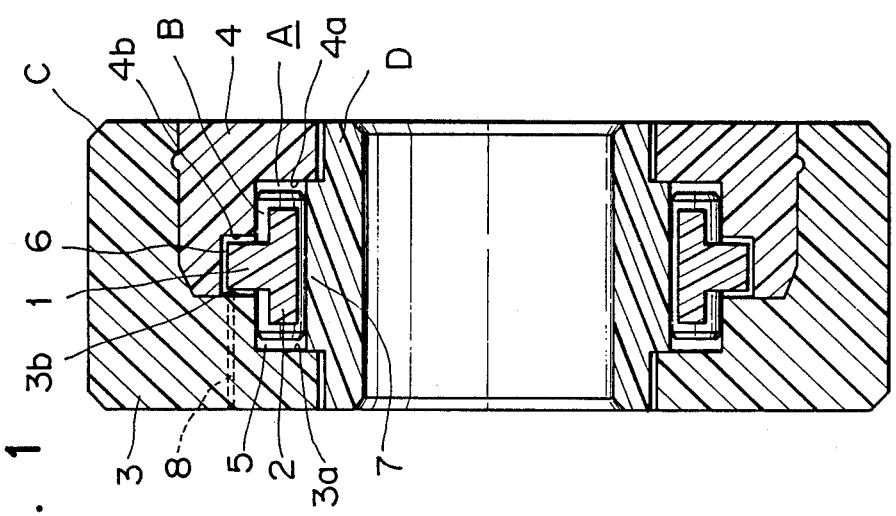
FIG. 1 is a cross sectional view of an embodiment of the present invention.
Figure 4:
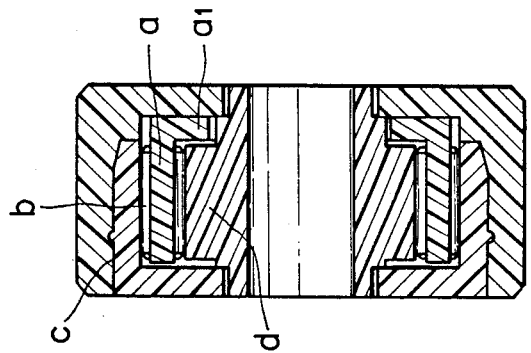
FIG. 4 is a cross sectional view of a prior art bearing.

Referring to FIG. 1 and FIG. 2, a bearing according to the present invention comprises an outer race C, a retainer A which is rotatably supported within the outer race C, and a plurality of needle rollers B rotatably supported by the retainer A. The retainer A includes a ring-shaped connecting member 1 and a plurality of elongate roller supporters 2. The elongate roller supporters 2 are connected integrally with the ring-shaped connecting member 1 therewithin. The roller supporters 2 are connected to the ring-shaped connecting member 1 substantially at longitudinally middle points thereof.

The roller supporters 2 extend parallel to an axis of the ring-shaped connecting member 1 with equal distances therebetween to provide spaces R for rotatably supporting needle rollers B therein. The rolling surfaces of the needle rollers B protrude somewhat from the spaces R inwardly and outwardly in a radial direction of the ring-shaped connecting member 1. This assembly of the needle rollers B and the retainer A is combined with the outer race C and an inner race D so that the protruded rolling surfaces of the rollers B are rotatably in contact with the inner circumferential surface of the outer race C and the outer circumferential surface of the inner race D.

The retainer A shown in FIG. 2 is formed of synthetic resin. The spaces R are defined by arcuate opposite surfaces 2a and 2a of adjacent roller supporters 2 for rotatably supporting the needle rollers B.

The outer race C is formed by fitting a small-diameter race 4 into a large-diameter race 3 having a generally L-shaped cross section. Side walls 3a and 4a of these races forming an annular groove 5 for supporting the retainer A while also forming a narrow annular groove 6 by circumferential walls 3b and 4b for supporting the ring-shaped connecting member 1 of the retainer A.

It should be noted that the longitudinal dimension of the roller supporters are shorter than that of of the needle rollers so that the roller supporters 2 do not touch the circumferential walls 3b and 4b. On the outer circumference of the inner race D formed is an annular protrusion 7 which is in loose insertion engagement with the aforementioned annular groove 5 to contact with the rolling surfaces of the needle rollers B. Additionally, the numeral 8 denotes an injection path of grease leading to the annular groove 6.

Figure 3:
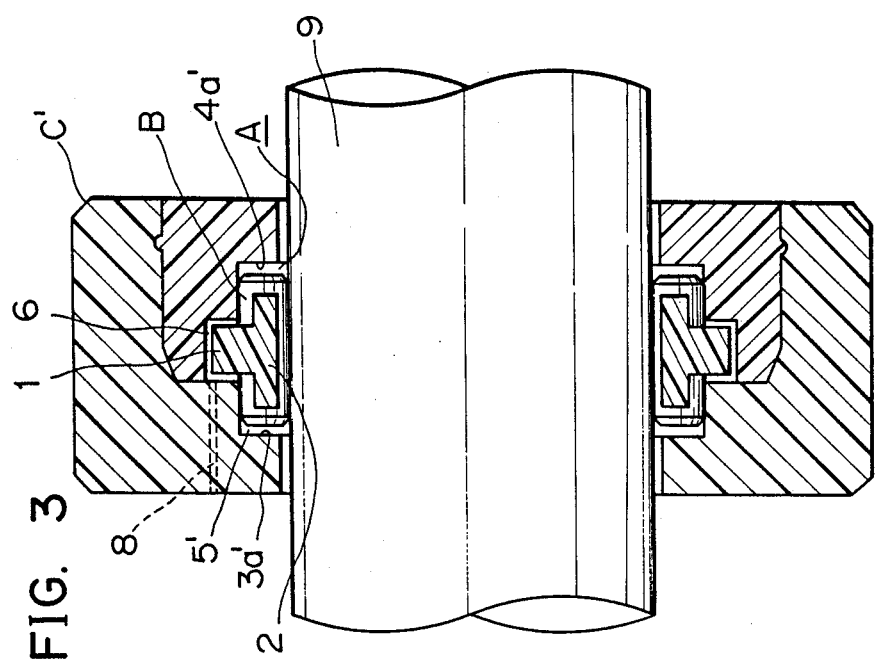
FIG. 3 is a cross sectional view of another embodiment of the present invention.

FIG. 3 shows another embodiment of the invention. In FIG. 3, short side walls 3a' and 4' are formed in an outer race C', and the rolling surfaces of the needle rollers B supported by the retainer A protrude inwardly from an annular groove 5'. Thus the needle rollers B rotate while they are in direct contact with a shaft 9 inserted into the retainer A.

As described above, with a bearing according to the present invention, a retainer includes a ring-shaped connecting member and a plurality of elongate roller supporters connected to the connecting member therewithin at longitudinally middle points thereof and needle rollers are supported in spaces between roller supporters; therefore bearings can be arranged in a compact size, and the annular groove in which the ring-shaped connecting member is supported can be effectively utilised as a grease basin.

What is claimed is:

1. A bearing comprising an outer race through which a shaft extends, a retainer which is rotatably supported within said outer race, and a plurality of needle rollers rotatably supported by said retainer, wherein said retainer includes:

a ring-shaped connecting member; and a plurality of elongate roller supporters respectively connected integrally with said connection member therewithin substantially at longitudinal mid-points of the supporters and extending sideways beyond said ring-shaped connecting member in parallel to an axis of said ring-shaped connecting member, said roller supporters being radially inwardly spaced from the connecting member with substantially equispaced distances therebetween to provide spaces for supporting said needle rollers by captivating major portions of the rollers therewithin with a portion of each roller adapted to extend radially inwardly out of the space; and said ring-shaped connecting member being coaxially rotatably supported in said outer race.

2. A bearing according to claim 1, wherein rolling surfaces of said needle rollers are in direct contact with said shaft.

3. A bearing according to claim 1, wherein said bearing further includes an inner race provided between said shaft and said rollers.

4. The bearing of claim 1, wherein said ring-shaped connecting member and each integral elongate roller supporters are substantially T-shaped in cross section.

5. The bearing of claim 1, further including a lubricating passage extending through the outer race into a space between the ring-shaped connecting member and outer race.

6. A bearing comprising an outer race through which a shaft extends, a retainer which is rotatably supported within said outer race, and a plurality of needle rollers rotatably supported by said retainer, wherein said retainer includes a ring-shaped connecting member, said ring-shaped connecting member being engaged with said outer race at an axially middle area of the outer race; and a plurality of elongate roller supporters respectively connected integrally with said connecting member therewithin substantially at longitudinal mid-points of the supporters, and extending sideways beyond said ring-shaped connecting member in parallel to an axis of said ring-shaped connecting member, said roller supporters being disposed with equal distances therebetween to provide spaces for supporting said needle roller therein, such that each elongate roller supporter and two adjacent needle rollers on both side thereof are in facing relation to each other substantially, along their entire lengths.

7. A bearing according to claim 6, wherein rolling surfaces of said needle rollers are in direct contact with said shaft.

8. A bearing according to claim 6, wherein said bearing further includes an inner race provided between said shaft and said rollers.

9. The bearing of claim 6, wherein said ring-shaped connecting member and each integral elongate roller supporters are substantially T-shaped in cross section.

10. The bearing of claim 6, further including a lubricating passage extending through the outer race into a space between the ring-shaped connecting member and outer race.

* * * * *